United States Patent [19]
Fortune

[11] 3,823,628
[45] July 16, 1974

[54] RAW MATERIAL FEEDER SYSTEM

[76] Inventor: William S. Fortune, 1450 Dearborn St., Panorama City, Calif. 91402

[22] Filed: Apr. 20, 1973

[21] Appl. No.: 352,946

Related U.S. Application Data

[63] Continuation-in-part of Ser. No. 168,673, Aug. 3, 1971, abandoned.

[52] U.S. Cl. ...................... 82/2.7, 82/2.5, 214/1.4
[51] Int. Cl. .......................................... B23b 13/10
[58] Field of Search ................. 82/2.5, 2.7; 214/1.4

[56] References Cited
UNITED STATES PATENTS

| | | | |
|---|---|---|---|
| 2,572,741 | 10/1951 | McCoy | 214/1.4 |
| 2,742,656 | 4/1956 | Fischer | 82/2.7 X |
| 2,781,574 | 2/1957 | Harney et al. | 214/1.4 X |

FOREIGN PATENTS OR APPLICATIONS

| | | | |
|---|---|---|---|
| 1,056,451 | 5/1955 | Germany | 214/1.4 |

*Primary Examiner*—Leonidas Vlachos
*Attorney, Agent, or Firm*—Daniel T. Anderson

[57] ABSTRACT

A raw material feeder for automatically feeding flexible stock, such, for example, as tubes or small-diameter rods of metal, plastic, or fiber into an automatically-controlled machine tool such, for example, as an automatic lathe. The feeder consists of an indexing drum having a plurality of peripherally-disposed, hollow tubes, each for housing one piece of the raw stock. By means of pneumatic pressure, each unit of stock is periodically advanced into the automatic lathe for performing drilling, milling, grinding, and the like operations. When the work piece is finished, another portion of the stock is automatically advanced into the lathe. Indexing is effected also by penumatic pressure. The drum of the feeder additionally serves as an air container serving as a moisture trap. The capacity of the feeder may be as large as 2,000 feet of quarter-inch stock while having a length of 12 feet. Another embodiment of the feeder has means for rotating a special hollow feeder tube containing a piece of raw stock to be machined and disposed adjacent the lathe. This will speed up the operation of the lathe. An air sensor mechanism is also provided which makes it possible to sense when the last portion of the raw stock has been used up adjacent the machine tool's collet. Alternatively, each of the hollow tubes of the indexing drum may be rotated by a suitable mechanism to reduce the space required for the feeder system.

7 Claims, 17 Drawing Figures

FIG. 1

William S. Fortune
INVENTOR.

William S. Fortune
INVENTOR.

William S. Fortune
INVENTOR.

BY
Daniel T. Anderson
ATTORNEY

RAW MATERIAL FEEDER SYSTEM

CROSS REFERENCE TO RELATED APPLICATION

The present application is a Continuation-In-Part of copending application, Ser. No. 168,673 filed on Aug. 3, 1971, and entitled "Raw Material Feeder System" and now abandoned.

BACKGROUND OF INVENTION

Field of the Invention

In order to operate an automatic machine tool such as an automatic lathe it is important to provide a raw material feeder so that the machine can operate continuously over protracted periods such as a day without human attention. Thus a turret lathe may be arranged to open its collet to permit injecting of a rod or tube-like workpiece. After the workpiece has been injected the collet may be closed for further operations. Usually then a coolant is applied to the machine, and a cross feed slide may be operated by a motor to make two separate laterally directed cuts on the work piece.

Various cutting tools may be provided in the turret lathe, which may successively be moved into operative position. Thus a plurality of concentric holes may be drilled by means of the turret and eventually the finished material may be cut off. The finished part may then be ejected, for example, by air pressure and the whole operation repeated. Thus the turret lathe may be provided with six drills or attachments and may be used to drill holes, to ream, to grind and to perform like operations. The lathe system is, of course, indexed and programmed to permit each tool successively to perform its operation.

All this may be done manually, but preferably is effected automatically. However, unless the turret lathe is provided with a self-loading attachment for feeding the raw stock or workpiece, it will require constant attention, and the savings in human labor otherwise effected by an automatic lathe is cancelled. Such a raw material feeder should also be flexible so that different materials or different-diameter raw stock may be used, depending on the job at hand. For example, the machine should be capable of being loaded with metal rods or plastic rods or alternatively with suitable tubes, such as plastic or fiber tubes. Preferably it should also be possible to load the raw material feeder with raw material of different diameter.

Prior art raw material holders are capable of storing only one or two lengths of rod or tubing. Generally an air nozzle is provided for blowing the rod successively into the rear of the collet of the lathe so that the collet may grip the rod.

It is accordingly an object of the present invention to provide a self-loading raw material feeder system.

A further object of the present invention is to provide a raw material feeder system which is capable of accepting various configurations and compositions of materials such as rods, bars, or tubes, whether of metal, plastic, or fiber.

Another object of the present invention is to provide a system characterized by a large material capacity, low cost, mechanical reliability and ruggedness, few moving parts and self-indexing capability.

Still another object of the present invention is to provide a raw material feeder of the type discussed which may be integral with an air distribution system and provides air storage and moisture trapping for the air used for the entire system.

Still a further object of the present invention is to provide a material feeder which permits high speed operation of the machine tool while minimizing noise which may be caused by friction and vibration between the rotating stock and the stationary raw material support tubes.

Yet another object of the present invention is to provide a sensing mechanism for the raw stock which can sense when the stock leaves the vicinity of the collet of the machine tool.

SUMMARY OF INVENTION

Briefly these and other objects are achieved in accordance with the structural aspects of an example of the invention in which a raw material feeder system comprises a drum which is rotatably mounted and a plurality of axially disposed tubes which is angularly distributed about the drum. Each tube is capable of housing one unit or piece of elongated raw stock. This raw stock may consist of rods or tubes such as plastic, fiber or small-diameter metal stock. Advance means such as an air pressure system is disposed in cooperative relationship with a selected one of the possible tube positions. This makes it possible to axially advance periodically, and on demand, the raw stock in the tube disposed at that selected position. Thus at the end of each cycle of operation of the automatic lathe a solenoid valve may be actuated to permit air pressure to advance further the raw material a predetermined axial distance through, for example, the collet of a lathe.

Sensing means may detect when the raw stock in the selected tube has been exhausted, for example, a light source and photosensitive device may be mounted to illuminate the photosensitive device in the absence of and shadowed by the presence of the raw stock. This may be arranged to actuate an indexing means mounted in cooperative relation with the drum for advancing the drum so that an adjacent one of the tubes is advanced to the selected operative position so that the raw stock therein can be advanced by the air pressure.

Further features of the invention may include the particular indexing mechanism which is pneumatically operated as well as the physical construction of the feeder drum and the integral air system which is used not only for advancing the raw stock, for indexing the drum, but also for lubricating the turret lathe and for ejecting the finished part.

Additionally, the indexing drum may be provided with a storage space for air used in the system which also serves as a moisture trap. Other features include means for rotating the raw material feed tube which houses the raw stock to permit faster operation of the lathe with a minimum of noise.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF PREFERRED EMBODIMENTS

TURRET LATHE

Figure 1:
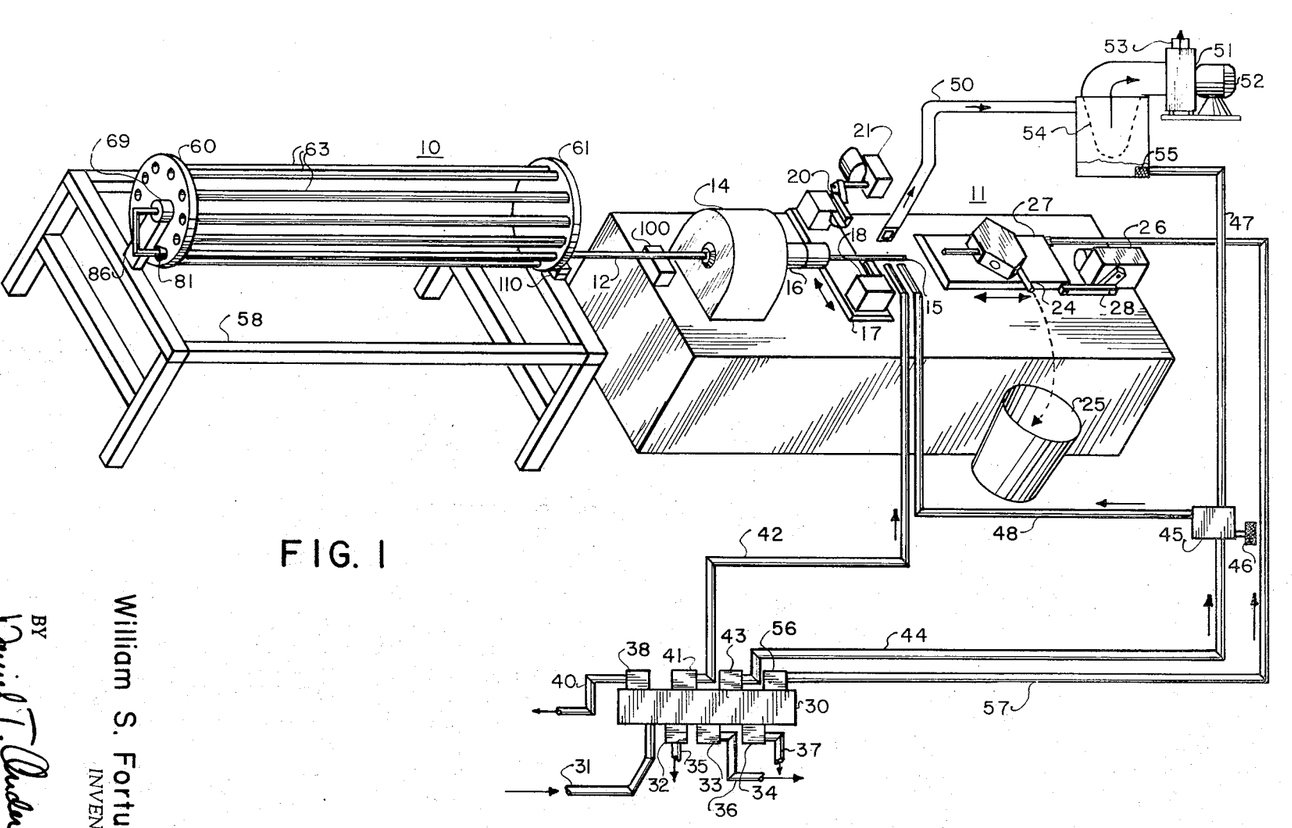
FIG. 1 is a schematic view in perspective of an example of a raw material feeder system, constructed in accordance with the principles of the invention shown in cooperation with a turret lathe and a portion of the air system for lubricating and cooling the lathe, for removing oil and cuttings, for ejecting the finished part, and for controlling an indexing mechanism.

Referring now to the drawings and particularly to FIG. 1, the example of the raw material feeder system 10 of the invention may cooperate with a machine tool such as a turret lathe 11 which may be manually operated but preferably is automatically controlled. For background to a complete understanding of the raw material feeder 10, an explanation of the operation of the turret lathe 11 is presented. The turret lathe 11 may be considered to be substantially conventional. In this connection the air system which is used in connection with the turret lethe 11 will also be described.

The raw stock, such as shown at 12 passes into a collet surrounded by a collet housing 14. The collet may be automatically or manually opened and closed and when closed rotates the stock 12 at the predetermined cutting velocity. A portion 15 of the stock is shown, extending from the tip 16 of the collet. A tool post 17 having a tool 18 therein is laterally slidably mounted adjacent the work 15, while another tool 20 is similarly mounted on the opposite side of the work 15. The two tools 18 and 20 may be controlled by a cross feed drive motor 21. They are usually moved in unison in opposite directions so that the respective tools 18 or 20 may, for example, cut the work 15 in sequence to perform two separate operations.

The turret lathe 11 is shown provided with a fixture 24 which serves to hold a finished part or workpiece and eject it by air pressure into a suitable parts bin 25. A turret drive motor 26 is linked to a turret platform 27 by a linkage 28 to advance and withdraw the turret. It will be understood that the turret is suitably indexed to present various tools to the work in a desired predetermined sequence.

As incidated above, the automatic turret 11 may be used for drilling, grinding or milling the work. It may be provided with various attachments, depending on the job at hand. In cooperation with the two cross feed tools 18 and 20, it may shape the work to the desired final shape and cut off the work which may then be held by fixture 24 and ejected when it has reached the desired position.

AIR DISTRIBUTION SYSTEM

An air distribution and control system is cooperatively associated with both the raw material feeder 10 and with the turret lathe 11. That portion associated with the turret lathe 11 is shown in FIG. 1 and will now be described.

The air system includes an air distribution block 30 having an air inlet line 31. The manner in which the compressed air is obtained will be subsequently explained. The air distribution block 30 is also provided with three solenoid valves 32, 33, and 34, each having an air outlet line 35, 36 and 37. The purpose of the solenoid valves 32 through 34 and 38 and their respective outlet lines 35 through 37 and 40 will be subsequently explained. A solenoid valve 41 with an air outlet line 42 controls the sweep air which is applied to the work 15 to blow away chips and lubricating oil.

Similarly a solenoid valve 43 has an air outlet line 44 which leads into a mixing chamber 45 having a mixing valve 46 for mixing the air with a cutting solvent fed into the mixing chamber 46 by a line 47. Hence cutting solvent and air are mixed in the chamber 45 and are applied by a line 48 to the work 15 to supply a suitable cutting solvent or lubricant. The cuttings or chips, together with the cutting solvent are removed by a vacuum line 50, disposed also in the neighborhood of the work 15. This vacuum is generated by a blower 51 operated by a motor 52 and draws the air in the line 50 into the exhaust 53. The air is filtered by a screen 54 and the accumulated cuttings and solvent are filtered through the filter 55 before the solvent or oil is returned to the mixing chamber 45.

Another solenoid valve 56 connected to the air distribution block 30 has an air outlet line 57 which connects to the turret platform 27 and is connected to the fixture 24 for ejecting the finished part.

Before discussing the remainder of the air system which cooperates with the materials feeder 10, and with the index mechanism thereof, it is deemed useful first to describe the construction of the materials feeder system.

RAW MATERIAL FEEDER SYSTEM

Figure 2:
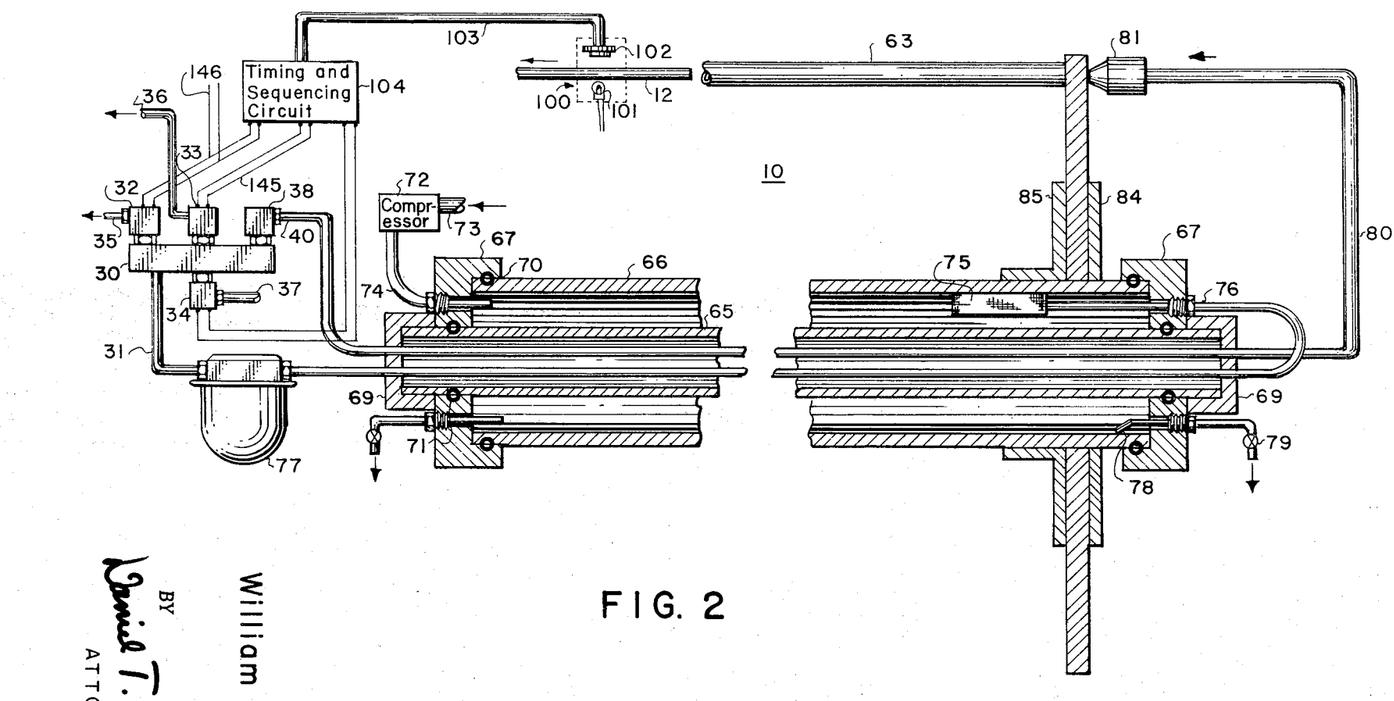
FIG. 2 is an elevational view, partly in section, of a portion of the raw material feeder system including a part of the air pressure system, a sensor for detecting presence or absence of the raw stock, and the control of the air pressure system.

Referring now to FIGS. 1 and 2, the material feeder system 10 is mounted on a frame 58 which may be made, for example, of angle iron or similar material and should be sufficiently rigid to support the material storage cage with the raw stock housed therein. As shown particularly in FIG. 1, the raw material feeder may have a front support disk 60 and a rear support disk 61 and a plurality of angularly, equally spaced hollow tubes 63 extending therebetween, each tube being capable of housing or storing a unit of the raw material.

Figure 3:
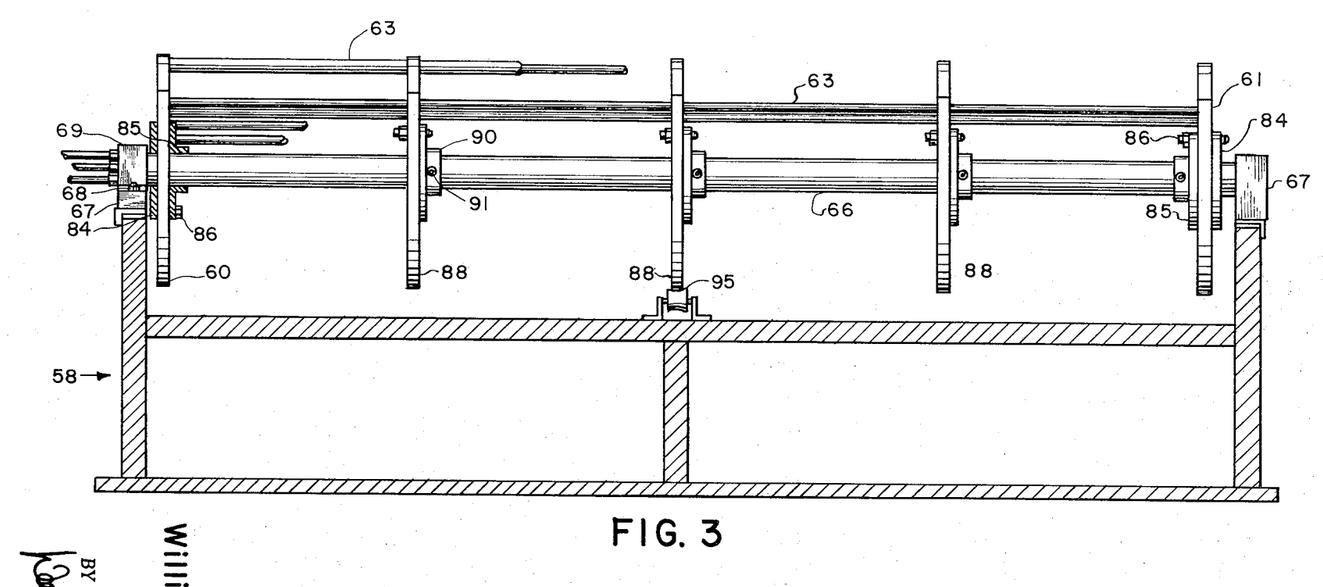
FIG. 3 is an elevational view, on enlarged scale, illustrating the mechanical construction of this example of the drum of the raw material feeder.

As shown particularly in FIGS. 2 and 3 to which reference is now made, the material feeder drum assembly includes a bearing retaining pipe 65 surrounded by a main support tube 66. The main support tube 66 is mounted in a substantially air tight manner to serve as a compressed air reservoir which has the additional purpose of constituting a moisture trap. At each end of the frame 58 there are mounted bearing blocks 67. They may be secured by cap screws 68 to the frame 58. The bearing blocks 67 and bearing retaining pipe 65 are closed or sealed at both ends by a pipe cap 69. The bearing blocks may, for example, be made from delrin to provide suitable friction bearings. These bearings support the main support tube 66 which may, for example, be made of aluminum alloy. Its primary purpoe is to support rigidly the drum assembly.

Further as referred to previously, the tube may serve as an air storage tank when suitably sealed and additionally, remove moisture from the pressurized air. To this end, the front bearing block 67 may be provided with an O-ring 70 for sealing it to the main support tube 66. Similarly the front bearing block 67 may be sealed by an O-ring 71 to the bearing retaining pipe 65.

A compressor 72, with an air inlet 73 may supply compressed air through a line 74 extending through the rear bearing block 67 into the annular space between the bearing retaining pipe 65 and the main support tube 66. The air may then be filtered by a filter 75 and may be withdrawn through an air line 76 extending through front bearing block 67 and the pipe caps 69 and into an air lubricator 77 from which the air passes into the air distributor 30 by means of the air inlet line 31. The accumulated moisture may be withdrawn by one or more water ducts 78 sealed through the bearing block 67 and closed by a valve 79. Thence the compressed air which is heated by the action of the compressor 72 is cooled in the annular space or air supply chamber between the bearing retaining pipe 65 and the main support tube 66. As the air cools much of its moisture precipitates and accumulates at the lowest point of the air supply chamber. At the same time the reservoir volume of the air supply chamber minimizes any drop in the air pressure due to a sudden demand by opening of one of the solenoid valves 32–34 or 38.

The air from the outlet line 40 may also pass through the pipe caps 69 and into a continuing air line 80 which ends in an air nozzle 81. As will be more fully explained hereinafter, the air nozzle 81 serves the purpose of forcing the raw material out of the selected one of the tubes 63.

Mounted near the front end of the main support tube 66 is the front support disk 60 (see also FIG. 3). The front support disk 60 is secured by a backing plate 84 and a flange collar 85, the flange of which surrounds the main support tube 66. By means of disk mounting bolts 86, the front support disk 60 is secured to the backing plate 84 and the flange collar 85. The rear support disk 61 is mounted in the same manner on the main support tube 66. Between the front and rear support discs 60 and 61 there is provided a plurality of auxiliary supporting discs 88 of which there may be three as shown. Each of the supporting disks is secured by its flange collar 90 to the main support tube 66. The flange collars 90 are adjustably secured to the support tubes 66 by collar set screws 91.

All the supporting discs 60, 61 and 88 may, for example, be made of plexiglas. Each of the discs has a plurality of circumferentially spaced holes or apertures 93 around its circumference as shown particularly in FIG. 4. The various support dics 60, 61 and 88 are so angularly adjusted that the various holes are in alignment or axial register with each other. This permits the tubes 63 to extend through the whole set of holes. Each of the tubes 63 is long enough to span the distance between the front support disc 60 and the rear disc 61. The material support tubes 63 may, for example, be made of stainless steel to minimize any tendency of the work to suffer corrosion. The maximum number of support tubes which may be spaced about the circumference of the support discs 60, 61 and 88 depends on the diameter of the raw material desired and on the diameter of the support discs.

Figure 4:
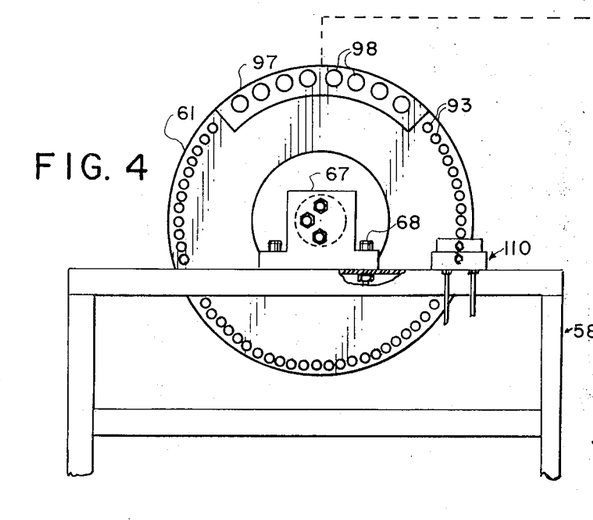
FIG. 4 is a side elevational view of the drum of FIG. 3 illustrating an example of an indexing mechanism feature of the invention and a removable drum section for housing raw material of different diameter.

Thus as shown, particularly in FIGS. 3 and 4, the support tubes 63 form a cage of generally cylindrical shape. Due to the weight of the raw material in each of the tubes, it may be necessary to support the cage along the center thereof. To this end, one or more support rollers 95 may be mounted on the frame 58 for rotatably supporting one of the discs 88, thereby to minimize the downward strain of the cage. The support tubes 63 may be metallurgically bonded or adhesively secured to their respective support discs by any suitable adhesive such, for example, a silicone rubber adhesive.

Figure 5:
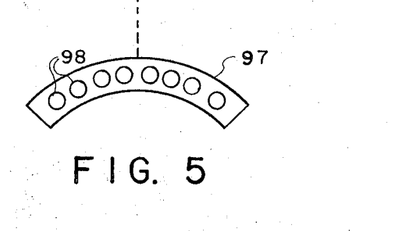
FIG. 5 is an elevational view of the removable drum section of FIG. 4.
Figure 6:
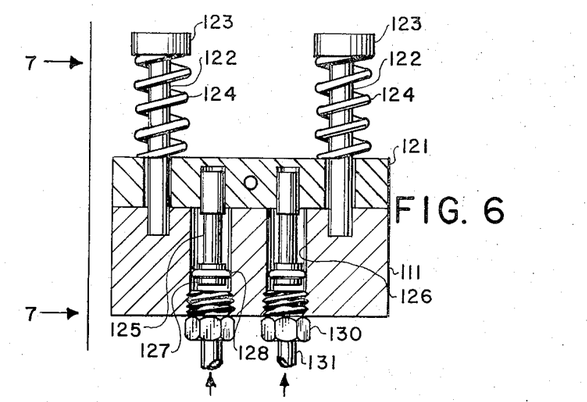
FIG. 6 is a front elevational view, partly in section of the indexing mechanism for the drum.

It is also feasible as shown particularly in FIGS. 4 and 5 to design the support and spacer discs, such as the disc 61, in such a manner as to allow insertion of a removable disc section 97, which may be provided with larger size holes 98. It will be understood that the disc sections 97 may be secured in any suitable manner, for example, by screws (not shown). The provision of a predetermined number of larger holes 98 permits the insertion of larger raw material tubes for receiving raw material of larger diameter. This, in turn, makes it possible to make available several sizes of material for feeding the machine tool for the purpose of manufacturing in any desired program, work of different types and different diameter.

In the operation of the above example of the raw material feeder system of the invention, energizing the solenoid valve 38 permits compressed air to pass through the compressed air line 40 through bearing retainer pipe 65 and air line 80 into the air nozzle 81. This nozzle is shown particularly in FIGS. 1 and 2 as lined up with a particular one of the raw material support tubes 63.

Accordingly the work 12 is forced to advance into the collet 16 so that the raw material may be shaped into the finished article. When this operation is finished the solenoid valve 38 is automatically energized again. This is part of the automatic sequencing or controlling operation of the turret lathe.

INDEXING MECHANISM

Eventually however the stock 12 in the selected support tube 63 is exhausted so that it is no longer possible to force the work 12 into the lathe. This event may be detected by a sensor mechanism 100 shown schematically in FIG. 1. This may, for example, consist of a light source 101 and a photosensor 102 which may be a photoconductive cell. This cell in this example, develops an output signal on its output leads 103 which feeds into a timing and sequencing circuit 104 for operating and controlling the indexing mechanism 110, shown schematically in FIG. 4. The timing and sequencing circuit 104 may include time delay devices for operating the solenoids 32, 33, 34 for predetermined periods of time and with a predetermined delay after a signal is developed by the photosensor 102.

Figure 7:
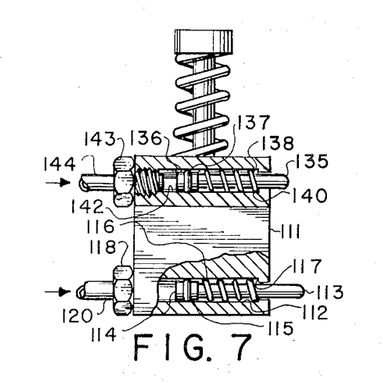
FIG. 7 is a side elevational view taken on line 7—7 of FIG. 6, partly in section, and illustrating the index and advance pins of the indexing mechanism.

This example of the indexing mechanism is shown in more detail in FIGS. 6 through 9 to which reference is now made. The indexing mechanism consists of an index base 111 which is provided with an aperture 112 in which an index pin 113 is retractably disposed. The index pin 113 has a pin plunger 114 which may be provided with a sealing O-ring 115. An index pin spring 116 bears against the pin plunger 114 and a shoulder 117 in the index base 111 and tends to retract the index pin 113 into the index base 111. An air fitting 118 coupled to an air line 120 permits compressed air to be supplied to the pin plunger 114 of the index pin to force it outwardly as shown in FIG. 7.

The compressed air line 120 connects to the air line 37 and serves to maintain the index pin 113 normally extended as shown in FIG. 7.

The indexing mechanism also includes a lifter block 121 which permits moving the rear support disk 61 when indexing of the drum is desired. The lifter block 121 is securely guided by a pair of lifter guide pins 122 which are securely fixed, for example, by sweating or press fit to the index base 111. Each of the lifter guide pins 122 is provided with a stroke adjustment collar 123 which may be threadedly engagable with the lifter guide pins 122 for adjusting the stroke. The lifter block 121 is free to slide along the lifter guide pins 122 until it is retained by the stroke adjustment collars 123. The springs 124 are disposed between the lifter block 121 and the stroke adjustment collars 123 and tend to urge the lifter block 121 against the index base 111.

Lifter plungers 125 are provided in order to lift the lifter block 121. Each lifter plunger 125 has one end secured to the lifter block 121 while its other end extends into an aperture 126 in the index base 111. Each lifter plunger 125 has a lifter plunger head 127 which may be provided with an O-ring for sealing purposes. An air fitting 130 with an air line 131 is secured to the opening 126 in the index base 111. Accordingly when air pressure is applied to the air line 131, the plunger heads 127, 128 are forced upwardly thereby to lift the lifter block 121 against the action of springs 124 in the manner shown in FIG. 8.

Figure 8:
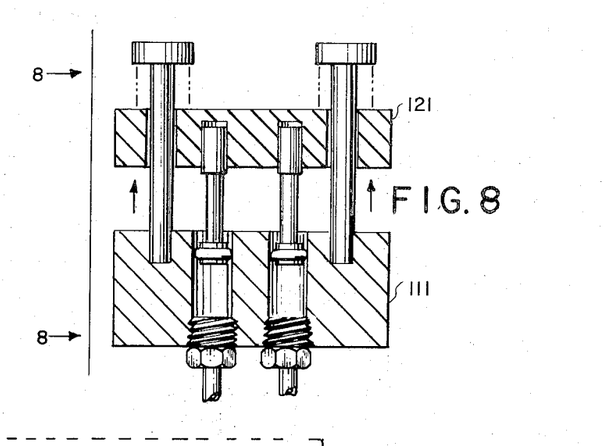
FIG. 8 is an elevational view similar to that of FIG. 6, partly in section, but illustrating the indexing mechanism in its extended or indexing position.
Figure 9:
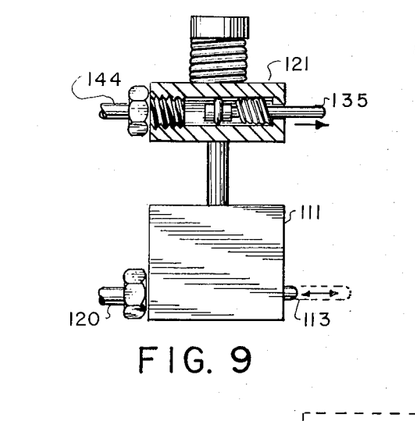
FIG. 9 is a side elevational view taken on line 9—9 of FIG. 8 and similar to that of FIG. 7, but again illustrating the indexing mechanism in its indexing position.

The material feeding drum assembly is now rotated or indexed by means of an advance pin 135 slidably disposed in the lifter block 121. The advance pin 135 is provided with a plunger head 136 which may be provided with a sealing O-ring 137. A spring 138 urges the advance pin 135 into its retracted position by bearing against the plunger head 136 and against a shoulder 140 in the cylindrical opening 142 of the lifter block 121.

An air fitting 143 connected to an air line 144 is inserted in the cylindrical opening 142 of the lifter block 121 so that compressed air may press against the plunger head 136 to force the lifter pin 135 into its advanced position shown in FIG. 9.

The operation of the indexing mechanism is described by reference particularly to FIGS. 2 and 7 through 9.

Normally air pressure is applied through air line 37 and air line 120 to cause the index pin 113 to extend as shown in FIG. 7. This will lock the appropriate openings 93 of the rear support disk 61 in a desired position. This will continue until the absence of a workpiece 12 permits the light from light source 101 to reach the photosensitive detector 102. This will now energize the timing and sequencing circuit 104 and energize the solenoid valve 34 to close it and to permit the indexing pin 113 to retract as shown in FIG. 9. Air is now applied to the lifter pin fitting 143 through air line 144 which is connected to air line 36. This is accomplished by energizing the solenoid valve 33 through the leads 145 from the timing and sequencing circuit 104. As previously described this will cause the lifter pin 135 to advance into an adjacent opening on the support disk 61. While the advance pin 135 is still outwardly extended by air pressure, the lifter block 121 is now raised. This is effected by supplying air to the air lines 131 which are connected together to the air line 35. To this end the solenoid valve 32 is actuated by leads 146 from the timing and sequencing circuit 104. This will accordingly raise the lifter block 121 and hence rotate the rear support plate 61 and thereby the entire drum assembly.

The material drum is rotated by an amount which may be adjusted by means of the stroke adjustment collars 123. When the rotation of the material drum is completed air pressure is again removed from the advance pin fitting 144 and also from the lifter air fittings 131. Finally air is reapplied to the index pin air fitting 120 thereby locking the material storage cage in its newly indexed position.

Figure 10:
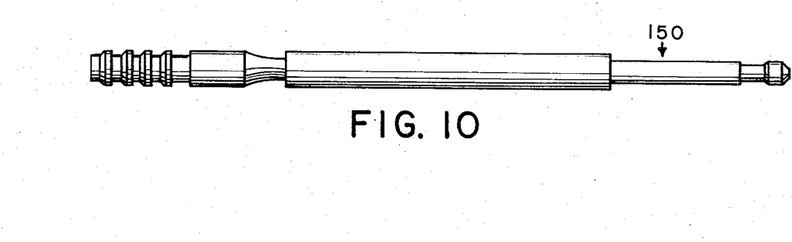
FIG. 10 is an elevational view of a rod that may be machined by the automatic lathe of FIG. 1 and illustrates by way of example the work that may be automatically machined by the lathe fed by the raw material feeder system of the invention.

Referring now to FIG. 10 there is shown, by way of example, a finished rod 150 that may be made in the automatic turret lathe fed by the material feeder of the invention. This may, for example, be the alignment rod of a solder removal apparatus of the type disclosed and claimed in U.S. Pat. No. 3,114,026, issued to the present applicant on Dec. 10, 1963.

FEED TUBE ROTATING MECHANISM

While it has been found that the raw material feeder system disclosed in FIGS. 1 – 9 has given satisfactory service, the speed of the automatic lathe is limited to about 2,000 rpm. The reason is that the stock 12 which is being worked in the lathe is housed within one of the fixed storage tubes 63 of the drum housing the stock. If the speed of rotation of the lathe is increased beyond this limit a large amount of vibration and environmental noise is created. This in turn creates excessive wear of each of the storage tubes 63 due to friction between the rotating stock and the fixed storage tube.

The embodiment of the invention illustrated in FIGS. 11 – 14 provides for much quieter operation. It also permits speeds of the automatic lathe or automatic screw machine of greater than 10,000 rpm. Furthermore, fewer malfunctions of the feeder mechanism have been experienced and greater flexibility has been achieved for the location of the sensor for the raw stock.

This improved feeder mechanism is illustrated in FIGS. 11 – 14 to which reference is now made.

Figure 11:
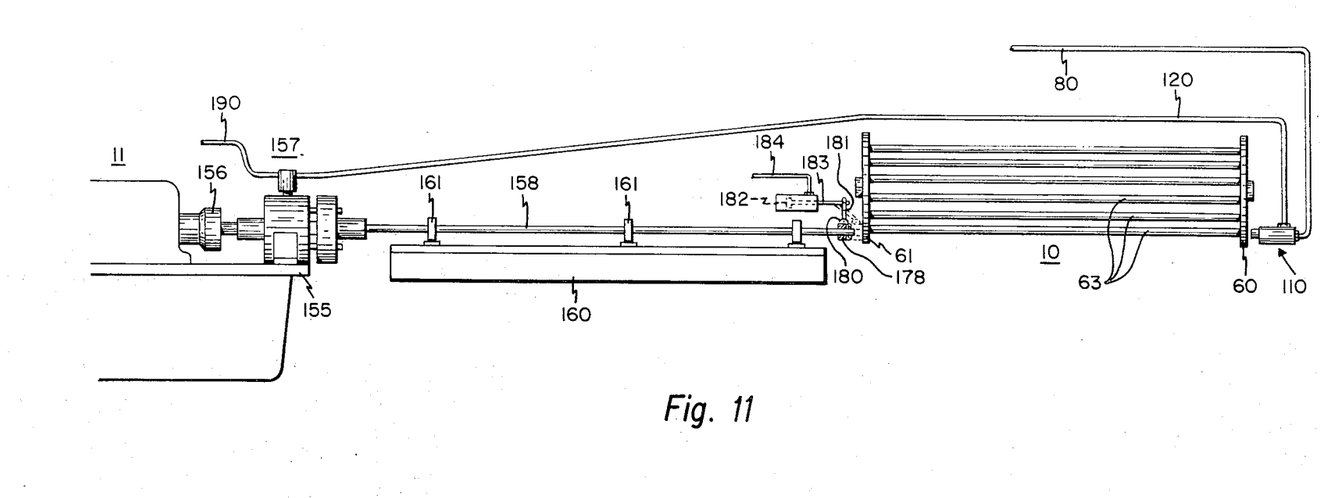
FIG. 11 is an elevational side view of another embodiment of a raw material feeder system in accordance with the principles of the invention and illustrates a rotatable material feeder tube for speeding up the operation of the lathe and minimizing noise.

There is shown again a lathe 11 which may, for example, be an automatic screw machine of the type having a reciprocating ram bed 155. There is further shown a rear collet 156 of the lathe which may be rotated by the lathe for holding and rotating the raw stock 12. Beyond the collet 156 there is a drive hub assembly generally indicated at 157 followed by a rotating feed tube 158 which may be supported by a support rail 160 and a plurality of feed tube bearings 161. Beyond the rotating feed tube 158 there is provided the material feeder system 10 including an indexing drum having a plurality of stationary material storage tubes 63. The storage tubes 13 in turn may be supported by a front support disc 60 (disposed at the end away from the lathe) and a rear support disc 61.

The entire raw material indexing drum may be identical with that previously described and may include an indexing mechanism 110 which may be identical to that previously described. The indexing mechanism 110 is disposed at the front support disc 60 and is provided with an air space line 80 which serves the purpose of periodically forwarding by air pressure the raw stock 12 on demand. It may also be provided with an air line 120 for supplying compressed air to the indexing mechanism 110 which then will index the drum into its next position.

Figure 12:
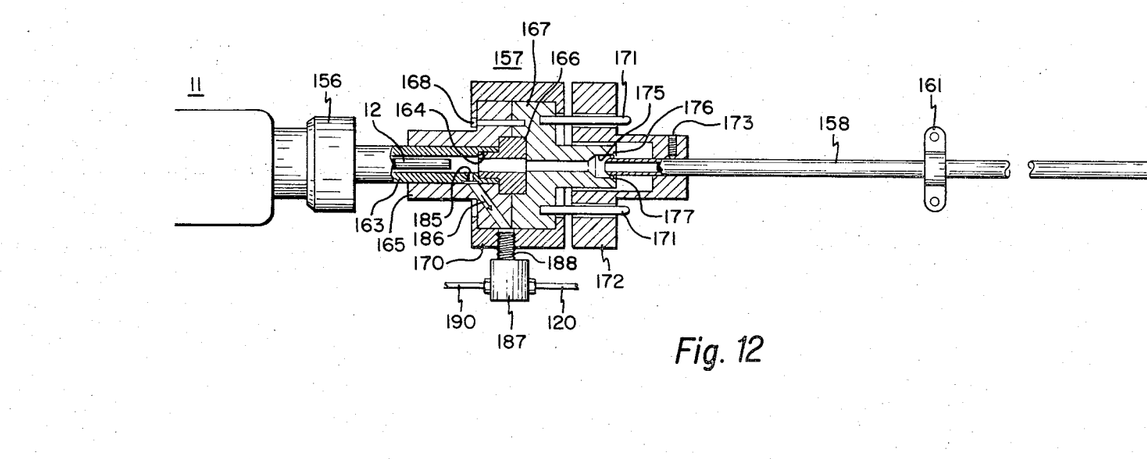
FIG. 12 is a top plan view on enlarged scale of a portion of the feeder mechanism of FIG. 11 and illustrates particularly the drive hub assembly for rotating the raw material feed tube and permitting reciprocating movement of the collet.
Figure 14:
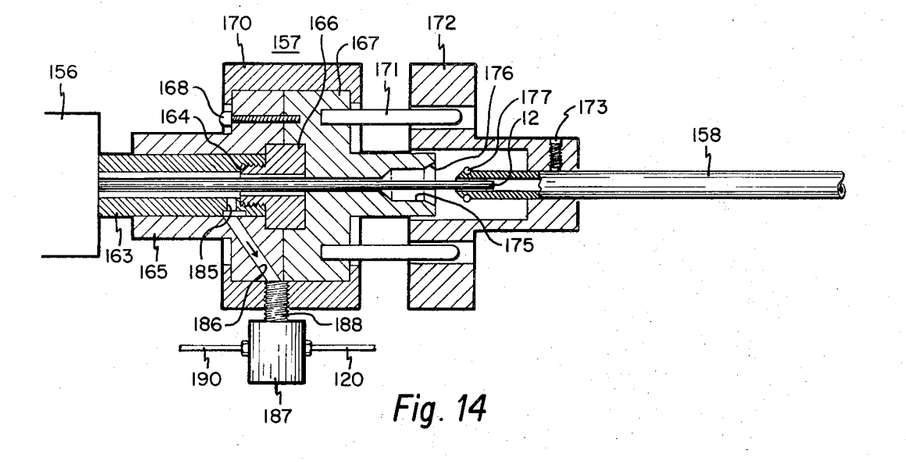
FIG. 14 is a cross-sectional view of the drive hub assembly shown in its normal position where the stock is being machined.

For the purpose of rotating the feed tube 158, there is provided the drive hub assembly 157. This includes a collet spindle 163 provided with internal threads shown at 164. A primary drive hub 165 extends over the collet spindle 163 and is tightened to the spindle by a threaded nut 166. A secondary drive hub 167 is then bolted by bolts 168 to the primary drive hub 165, thereby to hold both primary and secondary drive hubs 165,167 firmly to the collet spindle 163. Accordingly, as the collet spindle 163 rotates along with the collet 156 so also do the primary and secondary drive hubs 165,167.

A drive hub case 170 is made up of two halves so that they can be bolted or connected together to form a case and a bearing assembly within which the two drive hubs can rotate. A plurality of drive pins 171 is pressed into the secondary drive hub 167 over which can slide a feed tube drive hub 172. In other words the feed tube drive hub 172 will rotate along with the primary and secondary drive hubs 165, 167 but permits reciprocal movement with respect thereto. Actually, the feed tube drive hub 172 does not reciprocate but only rotates while the remainder of the drive hub assembly reciprocates along with the ram bed 155. The rotating feed tube 158 is secured to the rotating feed tube drive hub 172 by a set screw 173.

Figure 13:
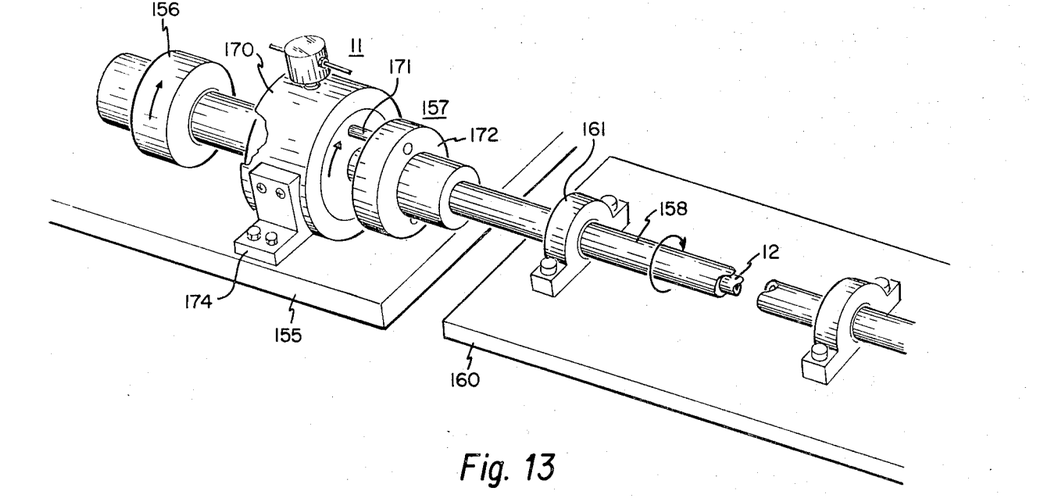
FIG. 13 is a view in perspective on a reduced scale of a portion of the apparatus of FIG. 11 and showing particularly the reciprocating ram bed forming part of an automatic lathe.

As clearly shown in FIG. 13, the drive hub case 170 is bolted by an angle piece 174 to the reciprocating ram bed 155. The ram bed 155 reciprocates in accordance with the operation of the lathe. Therefore, the drive pins 171 permit the drive hub 170 to move toward the left and the right of the feed drive hub 172 as clearly shown in FIGS. 12 and 14. In the position shown in FIG. 12 the ram bed 155 has moved toward the right. During this time the collet 156 opens and the raw stock is advanced by air pressure provided by the air tube 80 toward the left. During the actual operation of the lathe the parts are in the position shown in FIG. 14 where the drive hub 170 is spaced from the feed tube drive hub 172. It will be understood that the rotating feed tube 158 does not reciprocate.

As shown particularly in FIGS. 12 and 14, there is provided a generally cylindrical opening 175 in the secondary drive hub 167 followed by a conical opening 176. This is so dimensioned and the rotating feed tube 158 is so long that when the drive hub case 170 approaches the feed tube drive hub 172 the tube 158 is housed in the conical recess 176. The feed tube is now sealed by an O ring 177 which bears against the conical recess 176 as clearly shown in FIG. 12. This will seal the space between the rotating feed tube 158 and the secondary drive hub 172 while an air blast is supplied by air line 80 to the rotating tube 158. It will be understood that when the parts are in the position of FIG. 14, that is while the raw stock is being machined, there is no need to seal the end of the rotating feed tube 158 because little air can escape. Even if some air did escape it would not interfere with the operation of the feed mechanism.

It is now necessary to periodically seal the space between the right-hand end of the rotating feed tube 158 and the left-hand portion of the associated or indexed stationary storage tube 63. To this end there is provided a pressure seal mechanism shown in FIG. 11 which includes a cylindrical seal 178 which is normally disposed over the right-hand portion of the feed tube 158. This seal 178 may be moved toward the right of FIG. 11 by a lever 180 having a pivot point 181 and which is operated by an air piston 182 and a rod 183. Thus when the air line 184 is provided with compressed air the piston 182 will move toward the left thus pivoting the lever 180 about its pivot 181 and will move the seal cylinder 178 toward the right. This will seal temporarily the rotating feed tube 158 to the stationary storage tube 63. The air piston 182 may be activated, for example, by a collet switch which also signals for an air blast through air line 80 to advance the raw stock toward the left.

AIR SENSOR MECHANISM

The embodiment of the invention shown in FIGS. 1 – 9 is provided with a sensor mechanism 100 which consists of a light source and a photosensor. However, it has been found that the photosensor does not operate properly due to dirt such as oil or chips which may coat either the lens or the light source. It has been found that a sensor mechanism which senses air pressure is not subject to these disadvantages.

In addition it was not possible with a light source and photosensor as illustrated in FIG. 2 to place the sensor mechanism inside the collet 156 or in the vicinity of the collet. Such a design prevents sensing short remnants of stock which may still be contained in the vicinity of the collet. For example, if the distance between the cutting tool of the lathe and the sensor at the rear of the collet is 20 inches and if each finished part is 7 inches in length, two complete pieces could be machined from the remaining 20 inches of stock. However, a third piece would also be machined by the lathe and ejected like a normal part but it has to be subsequently scrapped because it is too short. It will readily be understood that the machine performs an unnecessary operation on a length of stock which is too short.

If the sensor mechanism can be placed closer to the cutting tool the situation described hereinabove will not occur. With say 20 inches of stock remaining two complete pieces can be machined while the uncompleted portion of stock can be ejected because the sensor can actuate a control valve to blow out the short remnant.

One form of the air sensor of the invention has been shown in FIGS. 12 and 14. It includes a sensing port 185 extending through the collet spindle 163 and continuing through a channel 186 through the primary drive hub 165 into an air sensor 187. The air sensor may be screwed by a hollow screw 188 into the drive hub 170.

The air sensor 187 is a sensitive air valve which is normally closed so that air supplied into an air line 190 from a suitable supply will not pass into the air line 120 which operates the indexing mechanism 110. However, if a very small change in air pressure occurs at the sensing port 186 the internal valve of the sensor 187 opens to allow the compressed air from air line 190 to pass into air line 120 to initiate the indexing operation.

In the embodiment shown in FIGS. 12 and 14 the air port 185 is located at the right-hand portion of the collet spindle 163.

In some cases it may be desirable to have the effective air port even closer to the collet 156. Such an embodiment has been illustrated in FIG. 15. Here an air port 192 is located at the extreme left-hand portion of the collet spindle 163, that is close to the collet 156. The collet spindle 163 is surrounded by the primary drive hub 165 which has a sleeve-like extension as shown. The air port 192 is connected to the channel 186 by a duct 193 formed in the outer circumference of the collet spindle 163 and closed by the primary drive hub 165. With this construction it can be sensed when the raw stock 12 moves past the air port 192 so that only a small portion or remnant of the stock remains which can then be ejected.

Figure 15:
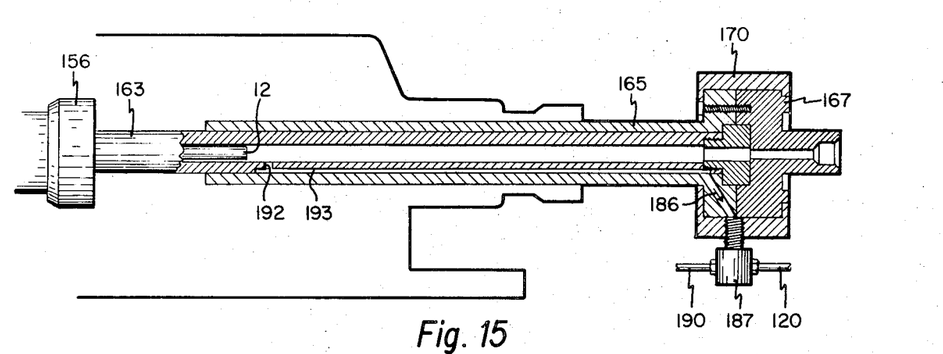
FIG. 15 is a cross-sectional view on enlarged scale of a portion of the drive hub assembly and including a raw material sensor having an alternative construction of the air duct provided for sensing the presence of the raw stock in the vicinity of the collet.

Accordingly, what the air sensor 187 senses is the compressed air which enters either the air port 192 of FIG. 15 or the air port 185 of FIGS. 12 and 14 when there is no stock left toward the right of the respective air ports.

ALTERNATIVE HIGH SPEED FEEDER

Figure 16:
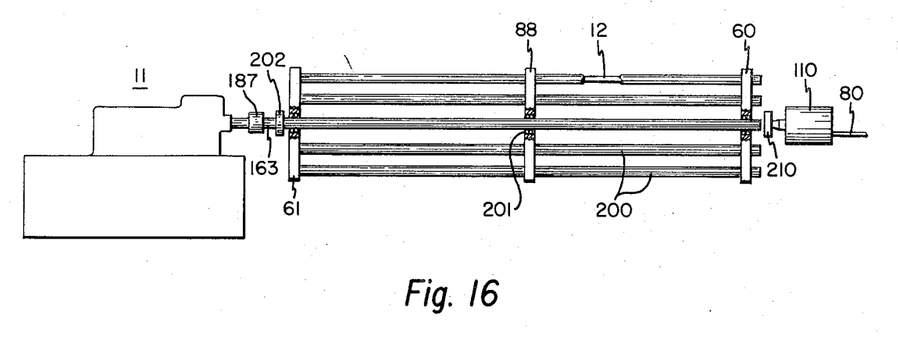
FIG. 16 is a side elevational view similar to that of FIG. 11 of still another modification of the raw material feeder system constructed in accordance with the principles of the present invention and providing a much shorter feeder mechanism having a plurality of material storage tubes arranged to be rotated at a high speed.
Figure 17:
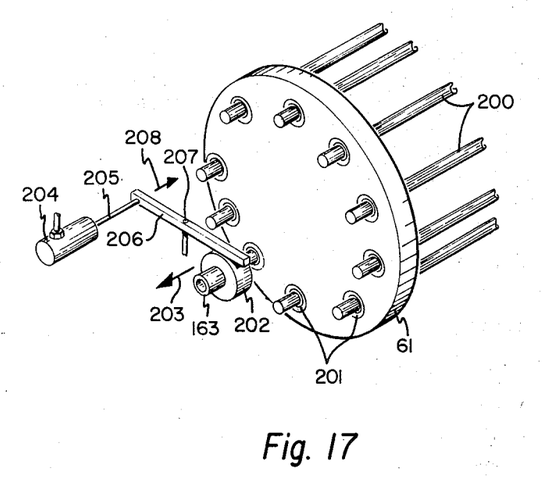
FIG. 17 is a view in perspective of a portion of the feeder of FIG. 16 and illustrating the end support disk for the rotating material storage tubes and particularly an air operated clutch arranged to be moved toward and away from a selected storage tube for the purpose of permitting indexing of the drum.

While the raw material feeder illustrated in FIGS. 11 – 14 permits high speed operation with very low noise and vibration, it still has a disadvantage in that it requires more space. Due to the provision of the rotating feed tube 158, it is necessary to make the unit over twice as long as the length of the raw stock. Accordingly, still another embodiment of the invention is illustrated in FIGS. 16 and 17 which requires much less floor space. Essentially, the feeder of FIGS. 16 and 17 require only a little bit more floor space than the length of the raw stock.

This is made possible by the provision of a feeder drum provided with a plurality of rotatable storage tubes 200. The storage tubes may again be mounted in a front disc 60 and a rear disk 61 and may include an additional disc 88 as shown. In each disc each of the rotating material storage tubes 200 is provided with a high speed bearing 201 such as a ball bearing. This will permit rotation of each raw material storage tube 200 at the necessary high speed.

In order to rotate a selected material storage tube 200 there is provided a clutch 202 which is preferably air operated because the remainder of the system is controlled by air. The clutch 202 may, for example, be directly connected to the collet spindle 163. For the embodiment of FIGS. 16 and 17 it as been assumed that the collet and ram bed are stationary. In general it should be pointed out that if the lathe used with the material feeder of the invention is of the type which does not provide a reciprocating ram bed and collet, the slip coupling shown particularly in FIGS. 12 and 14 of course will not be needed.

Accordingly, it will be seen that the air operated clutch 202 will drive a selected one of the rotating material storage tubes 200. When it is required to index the material feeder drum it is necessary to pull the clutch toward the left as shown by arrow 203. This may be effected by an air cylinder 204 having a suitable air piston to reciprocate by means of a piston rod 205 the lever 206 about its pivot 207. This will move the clutch 202 toward the left while the piston rod 205 moves toward the right as shown by the arrow 208. The air cylinder 204 may be controlled by a switch which responds to the opening of the collet of the lathe.

The material sensor 187 may be disposed as shown in FIG. 16, that is in the collet sleeve 163 to the left of clutch 202.

As indicated before, the indexing mechanism 110 includes an air line 80 which will apply a periodic air blast through the indexing mechanism 110 to the selected rotating material storage tube 200. Accordingly, a rotatable air seal 210 is preferably provided between the indexing mechanism 110 and the selected rotating storage tube 200.

Thus the embodiment of the invention of FIGS. 16 and 18 is characterized by requiring less storage space. On the other hand, the construction of the material storage drum is more expensive because it requires a plurality of high speed bearings for each of a plurality of rotating material storage tubes 200.

There has thus been disclosed a raw material feeder system which exhibits the advantage and achieves the objects set forth hereinabove. The material feeder of the invention is characterized by an extremely large capacity for raw material, by simplicity and few moving parts. It is preferably operated by a compressed air system which may also serve other aspects of a cooperating automatic lathe. A portion of the drum assembly may be used for storing the air and removing moisture therefrom. A pneumatically operated indexing mechanism forms part of the material feeder system and is operated in response to the raw material having been exhausted from one of the raw material tubes of the drum assembly.

Another embodiment of the invention substantially eliminates noise and vibration due to high speed operation of the lathe. This is effected by providing a rotating material feed tube disposed between the raw material storage drum and the lathe. Still another embodiment considerably reduces the necessary floor space by rotating directly a selected material storage tube forming part of the feeder drum. Finally, an air sensor system has been disclosed which permits to sense the presence or absence of the raw stock closely adjacent to the collet thus minimizing the danger of machining a piece which turns out to be too short for use.

I claim:

1. In a raw material feeder system for a machine tool comprising:
    a. a rotating collet;
    b. a collet sleeve extending from said collet;
    c. means for automatically advancing raw stock toward said collet through said collet sleeve and including a rotatable material feed tube;
    d. a hub assembly for coupling said collet sleeve to said feed tube for rotating said feed tube;
    e. means for periodically supplying air to said rotating feed tube for periodically advancing the raw stock toward said collet;
    f. an air sensor connected to said hub assembly; and
    g. an air port extending through said collet sleeve to said air sensor for sensing the air pressure in said collet sleeve and thereby the presence or absence of raw stock.

2. A feeder system as defined in claim 1 wherein said air port is disposed in the immediate vicinity of said collet for sensing the presence or absence of the raw material at said air port.

3. A feeder system as defined in claim 1 wherein said feeder system is provided with an indexable raw material storage drum, and an indexing mechanism for said drum, said air sensor being coupled to said indexing mechanism for controlling its operation.

4. A raw material feeder system comprising:
    a. an automatic machine tool;
    b. a rotating collet forming part of said machine tool;
    c. a rotatable raw material feed tube for housing the raw stock;
    d. a drive hub assembly for coupling said collet to said feed tube for rotating it; and
    e. an indexable drum assembly and including stationary material storage tubes, each for housing a desired length of raw stock.

5. A feeder system as defined in claim 4 wherein said drive hub assembly consists of two portions, and means for permitting one portion to reciprocate with respect to the other.

6. A feeder system as defined in claim 5 wherein said rotating feed tube is provided with seal means at its end disposed in said drive hub assembly for periodically sealing it for the purpose of permitting an air blast to pass through said feed tube to advance the stock therein.

7. A feeder system as defined in claim 4 wherein means are provided for periodically sealing said rotating feed tube to one of said material storage tubes to permit air to be applied through said material storage tubes into said rotating feed tube.

* * * * *